March 2, 1926.
W. COACKLEY ET AL
1,575,190
EGG MARKING APPLIANCE
Filed Feb. 6, 1925
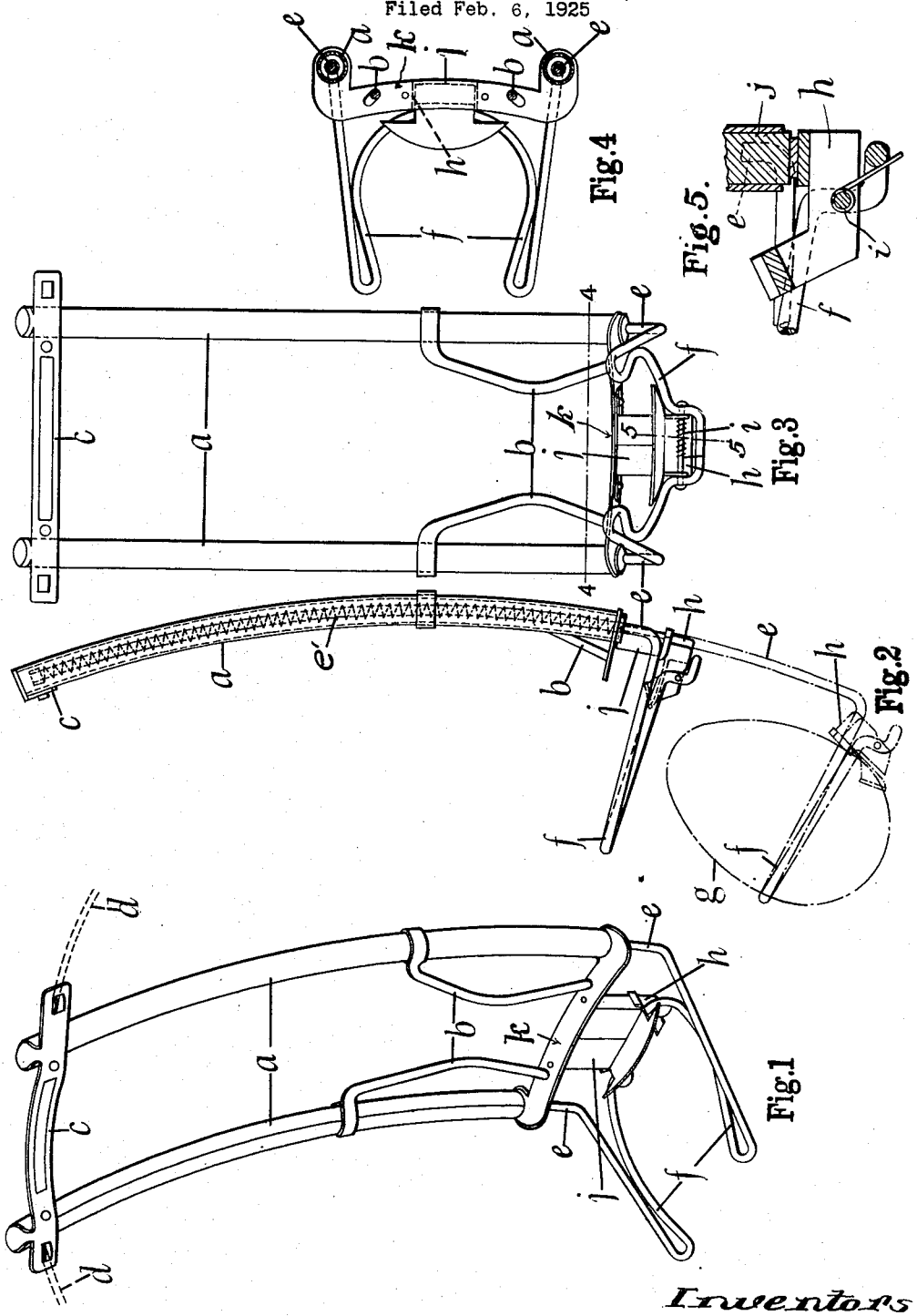
Inventors
W. Coackley
W. H. Gallimore
By Marks&Clerk Attys.

Patented Mar. 2, 1926.

1,575,190

UNITED STATES PATENT OFFICE.

WILLIAM COACKLEY, OF GOOSTREY, AND WILLIAM HENRY GALLIMORE, OF HOLMES CHAPEL, ENGLAND.

EGG-MARKING APPLIANCE.

Application filed February 6, 1925. Serial No. 7,418.

*To all whom it may concern:*

Be it known that we, WILLIAM COACKLEY, of the Laurels, Goostrey, and WILLIAM HENRY GALLIMORE, of Goostrey Utility Poultry Farm, Barnshaw, Holmes Chapel, both in the county of Chester, England, British subjects, have invented certain new and useful Improvements Relating to Egg-Marking Appliances, of which the following is a specification.

The object of our invention is to provide for the automatic registration or marking of the eggs by the bird itself in the act of delivering or laying the eggs.

Our invention comprises the provision of an appliance, for attachment to the bird, having a part adapted to receive the egg as it is being delivered or laid by the bird, and fitted with marking means for the egg and means allowing of the displacement of the said part against spring pressure as the egg is delivered or laid by the bird and its return, after the egg is fully delivered, to its normal position.

Referring to the two accompanying sheets of explanatory drawings:—

Figure 1 is a general perspective view of an appliance as constructed in one manner in accordance with this invention.

Figure 2 is a side elevation, Figure 3 is a plan, and Figure 4 an end elevation of such appliance.

Fig. 5 is an enlarged vertical sectional view of a detail taken on line 5—5 of Fig. 3.

The same reference letters in the different views indicate the same or similar parts.

In the form shown in the drawings, the appliance comprises a frame, which is adapted for attachment to the bird (hereinafter termed a hen) and made up from tubes as $a$ which lie on the back of the hen, tail engaging members $b$, and a cross piece $c$ with a strap or similar fastening $d$ which is placed across the breast of the hen.

Within the said tubes $a$ slide the stem-like parts $e$ of a wire of which the central portion is shaped as a ring-like or forked part $f$ to receive the egg as it is delivered by the hen, such part having marking means thereon which abut upon or impress the egg when it is in engagement with the part $f$.

The said stems $e$ which slide in the tubular parts $a$ of the frame are normally held in their inner positions by compression springs $e'$, Fig. 2, disposed in the tubes $a$, but as the egg is being delivered by the hen, the part $f$ and stems $e$ are carried outward (thereby compressing said springs) and thus move with the egg $g$ to the position shown by dotted lines in Fig. 2.

The marking means comprise a numbered, lettered, or other stamp $h$ pivotally mounted in association with a spring $i$ on the fork $f$. In the inner position of $f$, said stamp $h$ abuts against the pad in the pad-box $j$ fixed to the frame, but as the egg, in the process of delivery, meets and carries forward the fork $f$ toward the dotted line position shown in Fig. 2, it also engages and tilts the stamp $h$ against the action of the spring $i$, into contact with the egg $g$, as shown in Figure 2, and thus marks the egg. The tilting of the stamp $h$ also permits the egg to pass through and free itself from the fork $f$ so that the latter can return under the action of the compressed springs $e'$. When the stamp is at its inner or out of service position, the pad-box and pad completely covers the numbers or device on the stamp-face and protects the same and also itself from dirt and water. The pad is of any ordinary kind suitable for saturation with ink or the like. The pad-box $j$ is a sheet metal or other container open at one end to expose the pad and closed at the opposite end by the cross plate $k$ of the frame, to which the box is attached.

A counting device (not shown) may be mounted upon the attachment and be actuated by the frame $f$ so as to record the number of eggs laid and marked.

In some cases we may if desired dispense with an inking pad or the like and rely upon the natural moisture upon the egg when it is laid to show the required mark.

We may vary the details of our appliance to suit any particular requirements.

Our invention obviates the use of trap nests involving the enclosure of the hen and other difficulties.

We claim:—

1. In egg marking appliances, the combination comprising a frame, means for attaching said frame to a hen, a holder for the egg on its delivery by the hen the said holder being in sliding connection with said frame, and a marking stamp in pivotal connection with said holder the said stamp being engaged and tilted by the egg during said delivery.

2. In egg marking appliances, the combination comprising a frame, means for attaching said frame to a hen, a holder for the egg on its delivery by the hen the said holder being in sliding connection with said frame, compression springs bearing against said holder and arranged in said frame, a marking stamp in pivotal connection with said holder the said stamp being tilted in one direction by the egg during said delivery, and a spring whereby said stamp is tilted in the opposite direction.

3. In egg marking appliances, the combination comprising a frame, means for attaching said frame to a hen, a holder for the egg on its delivery by the hen, the said holder being in sliding connection with the said frame, compression springs attached to said holder and frame, a marking stamp in pivotal connection with said holder the said stamp being tilted in one direction by the egg during said delivery, a spring whereby said stamp is tilted in the opposite direction, and a pad secured to said frame and providing an abutment for the face of said stamp.

In testimony whereof we have signed our names to this specification.

WILLIAM COACKLEY.
WILLIAM HENRY GALLIMORE.